(No Model.)　　　　　　F. R. PACKHAM.　　　2 Sheets—Sheet 1.
SEEDING MACHINE.
No. 570,265.　　　　　　　　Patented Oct. 27, 1896.
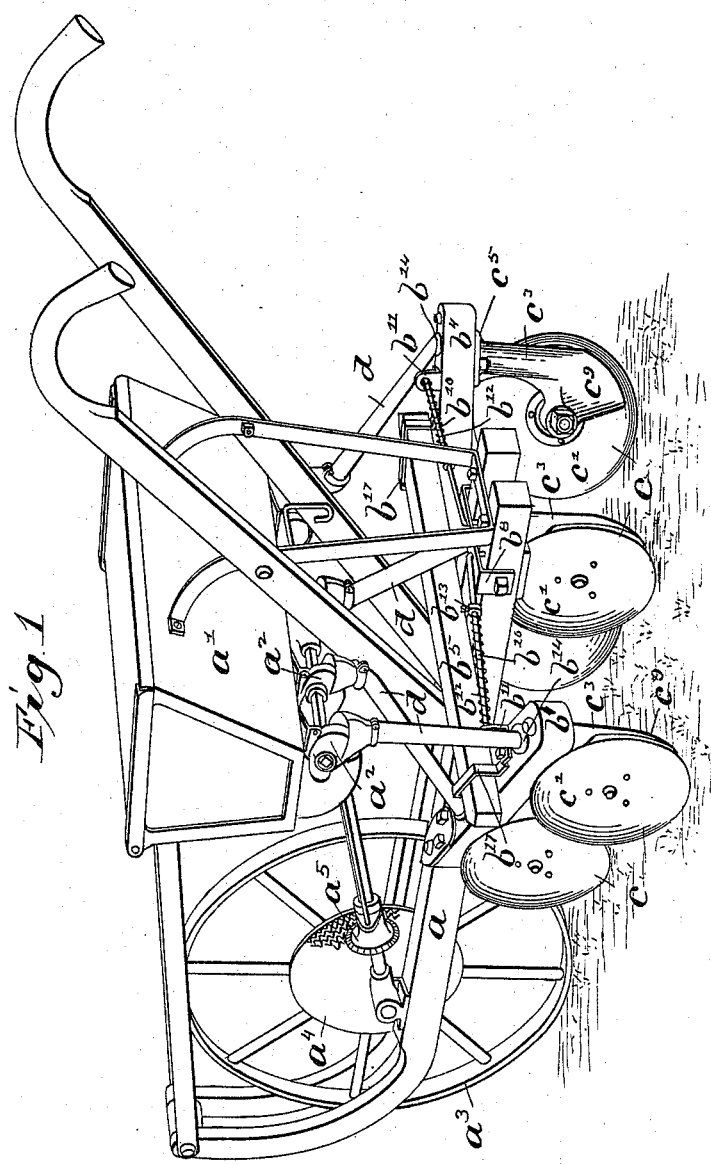

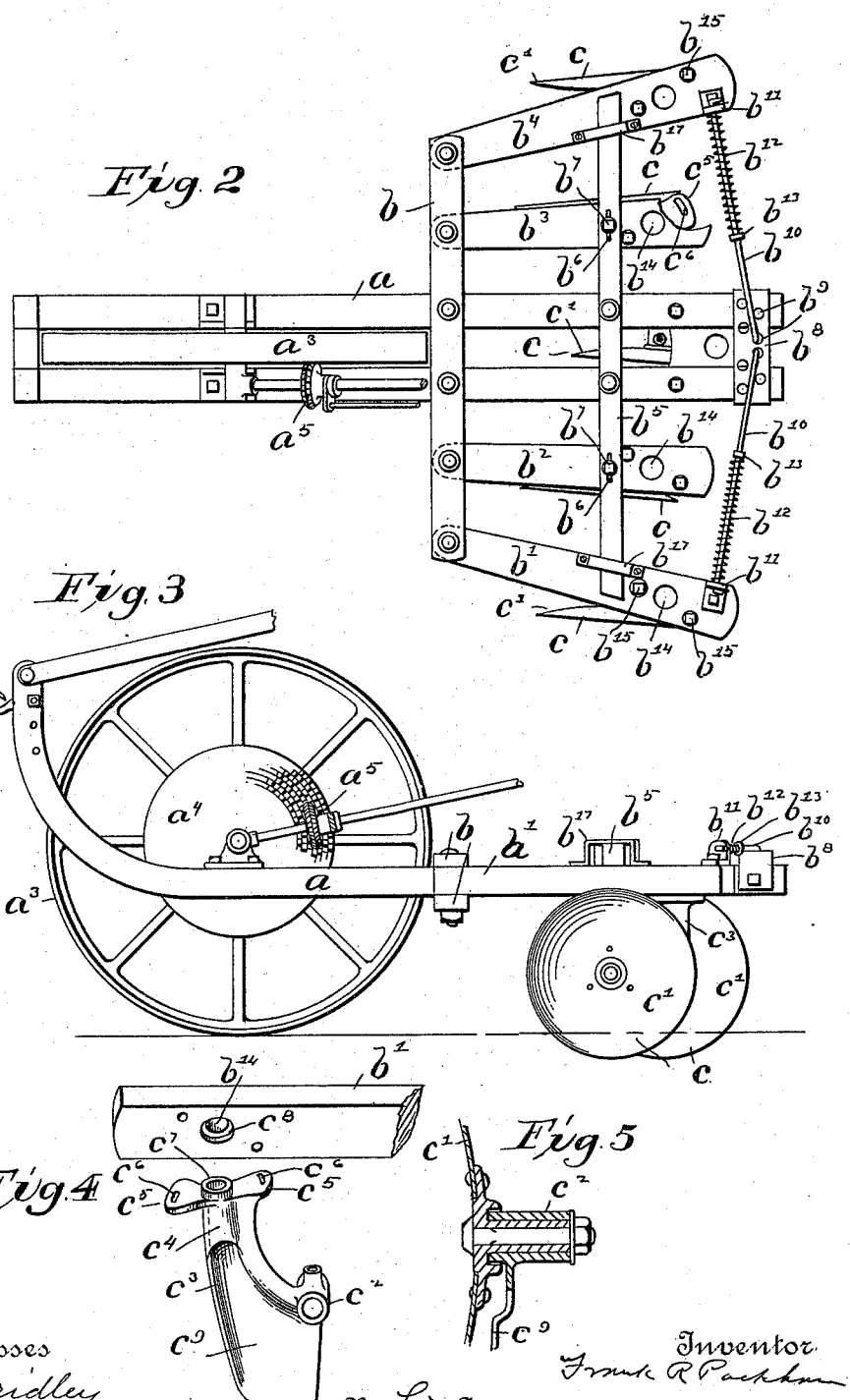

UNITED STATES PATENT OFFICE.

FRANK R. PACKHAM, OF SPRINGFIELD, OHIO, ASSIGNOR TO THE SUPERIOR DRILL COMPANY, OF SAME PLACE.

SEEDING-MACHINE.

SPECIFICATION forming part of Letters Patent No. 570,265, dated October 27, 1896.

Application filed July 1, 1896. Serial No. 597,737. (No model.)

*To all whom it may concern:*

Be it known that I, FRANK R. PACKHAM, a citizen of the United States, residing at Springfield, in the county of Clark and State of Ohio, have invented certain new and useful Improvements in Seeding-Machines, of which the following is a specification.

My invention relates to improvements in seeding machinery, and it especially relates to that class of seeding implements which is designed to plant between rows of standing corn.

The essential object of my invention is to provide a seeding-machine of this kind which shall be capable of operating between rows of different widths of planting and in which the furrows or trenches in which the seed is planted are formed by rotating disks.

My invention consists in the constructions and combinations of parts hereinafter described, and set forth in the claims.

In the accompanying drawings, Figure 1 is a perspective view of a device embodying my invention. Fig. 2 is a plan view of the same with some of the parts broken away. Fig. 3 is a side elevation of a portion of the same. Figs. 4 and 5 are detail views of the furrow-opening device.

Like parts are represented by similar letters of reference in the several views.

In the said drawings, $a$ represents a main frame, on which there is mounted a seed-hopper $a'$, which may be provided with the usual seed-distributers $a^2$. A single supporting and driving wheel $a^3$ is preferably employed at the front of the frame and through suitable rotating gears $a^4$ $a^5$ is adapted to transmit motion to the distributers $a^2$. The frame $a$ is preferably provided at the rear of the driving-wheel with a cross-bar $b$, to which is pivoted backwardly-extending wings $b'$ $b^2$ $b^3$ $b^4$. Each of these wings is provided with one or more furrow-opening devices $c$, and means are provided in connection with said wings for adjusting them about their pivotal connections with the bar $b$ to provide for different widths of planting and to provide for planting between corn-rows of different widths. A laterally-extending bar $b^5$, secured to the frame $a$ and extending across the different wings $b'$ $b^2$ $b^3$ $b^4$, &c., is preferably provided. This bar has slotted openings $b^6$, in which are secured bolts $b^7$, which connect the intermediate wings $b^2$ $b^3$ to said bar. The outer wings $b'$ $b^4$ are preferably provided with yokes $b^{17}$, which fit over said bar and permit the lateral adjustment of said wings. At the rear of the frame $a$ is a plate $b^8$, having a series of perforations $b^9$, and extending in each direction from this plate to the side wings $b'$ $b^4$ are links $b^{10}$. These links $b^{10}$ are adapted to hook at one end in the perforations $b^9$ and connect at the other end to suitable lugs or projections $b^{11}$ on the side wings, springs $b^{12}$ being preferably placed on said links and adapted to operate between the lugs $b^{11}$ and collars $b^{13}$ on the said links, so as to permit a limited yielding movement of said wings, the adjustment of said wings outwardly or inwardly being accomplished by changing the links to the different openings or perforations $b^9$ in the plate $b^8$.

The furrow-opener $c$ consists, preferably, of a disk $c'$, journaled in a sleeve $c^2$ on a supporting-conduit $c^3$. This supporting-conduit $c^3$ has at the top a hollow or tubular portion $c^4$, flanked on either side by projecting flanges $c^5$, each of which has a slotted opening $c^6$, which is preferably formed on the arc of a circle whose center is at the center of the tubular portion $c^4$. The tubular portion $c^4$ is preferably extended above the flanges in the nature of a boss $c^7$, which is adapted to fit in a corresponding depression $c^8$ in an opening $b^{14}$, which extends through each of the wings $b'$ $b^2$ $b^3$ $b^4$ and forms a part of the conduit or seed-channel from the hopper, the usual seed-tubes $d$ being provided from the distributers to said openings. These wings are also provided with suitable openings to receive retaining-bolts $b^{15}$, which extend through the wings and also through the slotted openings $c^6$ in the flanges $c^5$, thus furnishing the means for attaching the furrow-openers to said wings and also for adjusting said furrow-openers to change the angle thereof. This arrangement is important, because in disk furrow-openers the angle at which the disk is placed to produce the trench can be varied only within certain limits, and if there is a variation in the angle of the wings to change the width of planting there must be means for producing a corresponding variation in the angle of the disks. The supporting-conduit is also preferably extended downwardly below and behind the sleeve $c^2$ to form a guide or shield $c^9$, which is adapted to travel within the angle of the disk and thus within the furrow formed thereby, the construction being such that the shield conforms closely to the side of the disk and with the disk forms a continuation of the hollow portion $c^4$, (which, it will be understood, is cut away at the side adjacent to the disk,) so as to direct the seed into the channel, trench, or furrow formed by the rotating disk.

It will be seen from the above description that I provide a seeding-machine adapted to plant between rows of standing corn and be readily adjusted to different widths of planting, while the furrow-opener can be correspondingly adjusted to produce a uniform trench or furrow in any position.

In Fig. 1 the construction is slightly modified from that shown in Fig. 2, the furrow-opener $c$ being in Fig. 1 attached at different points in the length of the side wings $b'$ and $b^4$ and the intermediate wings being dispensed with. In either case the yielding adjustable connections of the side wings are so formed as to yield only within certain limits and within such limits as to not interfere with the proper formation of the furrow by the angularly-arranged disk.

Having thus described my invention, I claim—

1. In a seeding-machine, a frame having adjustable wings or frame-pieces, furrow-openers secured to said frame-pieces, each of said furrow-openers consisting essentially of a conduit and a sleeve-support on which is journaled a rotating disk, said conduit being connected to said frame so as to be adjustable thereon to change the angle of said furrow-opening disk to compensate for the adjustment of said frame or wing, substantially as specified.

2. In a seeding-machine, the combination with the frame having an adjustable wing or support, and a furrow-opener having a hollow tubular portion forming a seed-conduit, and means for securing said furrow-opener to said wing in line with an opening or perforation through said wing, and adjustable connections between said furrow-opener and said wing or support which will permit an axial adjustment of said furrow-opener about said hollow or tubular portion, substantially as specified.

3. The combination with a main frame and a pivoted wing, a furrow-opener consisting essentially of a supporting-conduit fitted to said wing, an angularly-arranged disk on said conduit, and means for connecting said conduit to said wing in different angles of adjustment, substantially as specified.

4. The combination with a frame, of a furrow-opener consisting of a conduit formed integral with a sleeve, and a rotating disk journaled to said sleeve, a tubular portion on said conduit journaled in a suitable opening in the supporting-frame, and means for securing said conduit in different positions of adjustment about said tubular portion, substantially as specified.

5. The combination with a main frame and side wings, the adjustable supporting-conduits having the furrow-opening disks thereon secured to said side wings, and the adjustable yielding connections between said side wings and the main frame, substantially as specified.

In testimony whereof I have hereunto set my hand this 27th day of June, A. D. 1896.

FRANK R. PACKHAM.

Witnesses:
RICHD. H. RODGERS,
CHAS. I. WELCH.